Aug. 19, 1952     P. B. WEISZ     2,607,482
SELECTIVE SEPARATION OF GEL PARTICLES
Filed April 9, 1951     2 SHEETS—SHEET 1
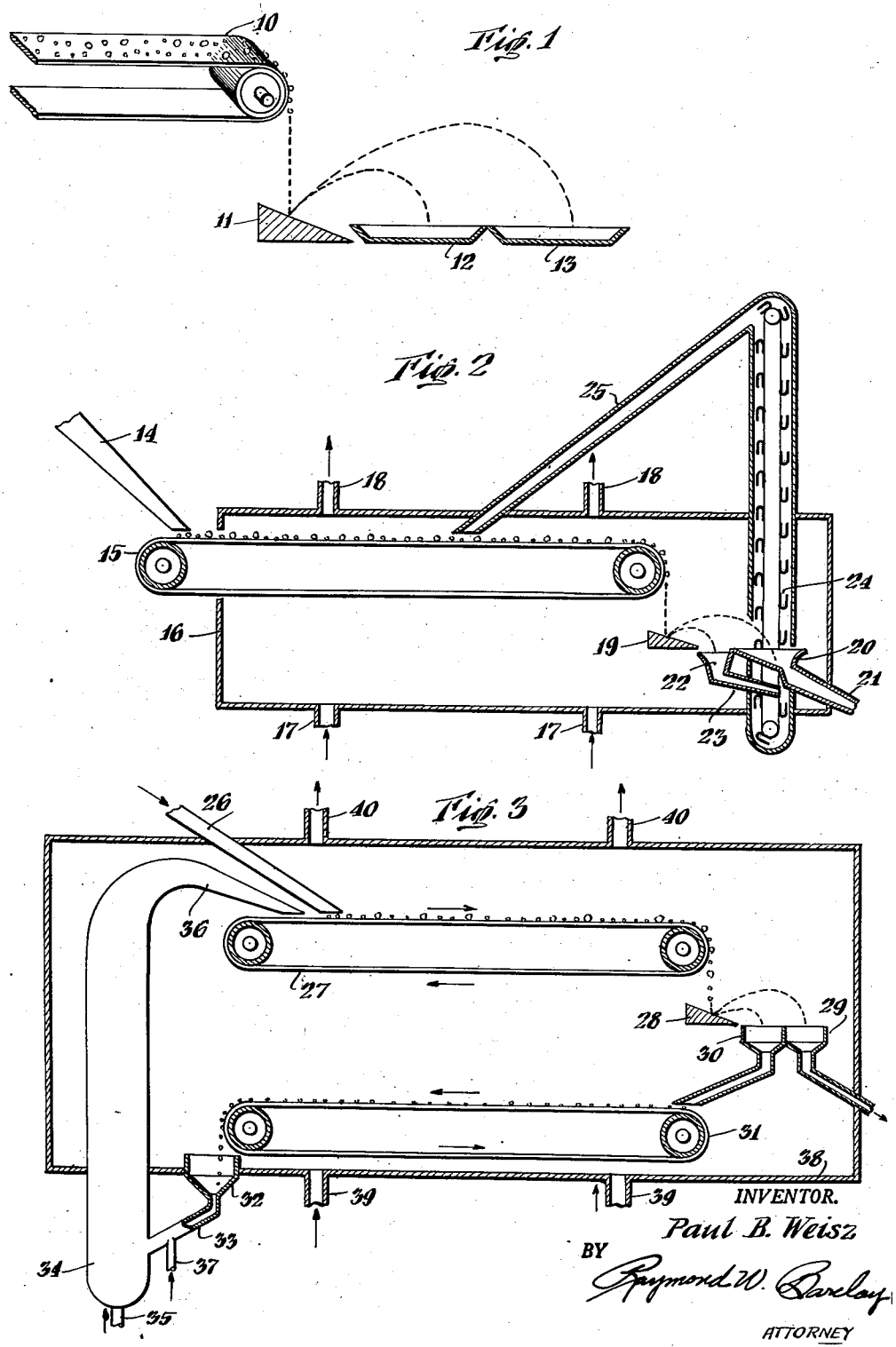
INVENTOR.
Paul B. Weisz
BY
Raymond W. Barclay
ATTORNEY Patented Aug. 19, 1952

2,607,482

UNITED STATES PATENT OFFICE 2,607,482

SELECTIVE SEPARATION OF GEL PARTICLES

Paul B. Weisz, Pitman, N. J., assignor to Socony-Vacuum Oil Company, Incorporated, a corporation of New York Application April 9, 1951, Serial No. 220,038

5 Claims. (Cl. 209—119)

This invention relates to an improvement in the manufacture of inorganic oxide gel spheroids and more particularly is concerned with a method for effecting selective separation of spherical gel particles after shrinkage thereof is substantially complete but before the final removal of water therefrom.

In recent years, considerable interest has developed in the manufacture of inorganic oxide gels as spheres, primarily because of the advantages inherent in this type of physical form. A number of processes for making spherical gel particles have been described in the art, such as, for example, the method of Marisic set forth in U. S. Patent 2,384,946. Briefly, this method involves the preparation of a gelable inorganic oxide hydrosol characterized by a relatively short time of gelation. The hydrosol is admitted in the form of separate globules to a body of oil or other water-immiscible fluid in which the globules assume a spheroidal shape and set to a hydrogel. The spheroidal hydrogel particles so obtained may be washed, base-exchanged, heat treated or otherwise processed to obtain the desired physical and chemical characteristics in the final product. The form of the particles is generally maintained substantially constant from a time prior to gelation until after the gel has been dried. During drying, the hydrogel spheres shrink considerably, usually to about one-tenth of their original volume. The extent of drying will depend somewhat on the use which it is desired to make of the product but, in any event, the drying is carried to a stage beyond that at which maximum shrinkage of the gel is obtained. The gel particles, after syneresis or shrinkage thereof has been completed, are substantially dry; that is, the gel possesses open pores free of liquid although it still contains a relatively small percentage of strongly adsorbed water which is evolved during the final drying operation carried out at relatively high temperatures.

One of the difficulties encountered in the formation of spherical gel particles has been the large loss of particles due to shattering during the drying operation. This shattering apparently results from internal stresses which develop within the spherical particles as the liquid phase is removed. It has been observed in operation that practically all of the shattering and breakage of spherical gel particles takes place during the final drying stages after shrinkage of the gel is substantially complete. Thus, the first stage of drying the spherical gel particles involves the shrinkage phase accompanied by a considerable volume decrease. It has been noted that shattering or breakage of the gel particles during this stage is susbtantially nil and that in the subsequent drying stage during which the gel particles undergo virtually no further volume change, the usually encountered breakage occurs. It has accordingly been found desirable to interrupt the drying operation after shrinkage of the spherical gel particles is substantially complete but before final drying and to subject the shrunken particles to an intermediate processing procedure designed to reduce the extent of gel breakage.

The present invention is directed to a method for automatically selecting and removing spherical gel particles from the drying operation after the shrinkage stage but before the final drying stage. The procedure described herein utilizes the fact that inorganic oxide gels become harder and more elastic as the liquid content thereof decreases. The method involves dropping the gel particles while still in the drying process from a predetermined height onto an inclined base of sufficient hardness as to cause the particles to rebound. Gel spheres of increasing hardness or degree of completion as regards shrinkage traverse longer trajectories than the particles which have not attained maximum shrinkage. The completely shrunken gel particles are thus separated from the partially shrunken particles by collecting the same in different receptacles or chutes. The particles in the receptacle most remote from the inclined base are those of greatest hardness while the particles in the receptacle adjacent to the inclined plate are those which have not yet attained the desired shrinkage. The latter may remain in the drying operation and after a short pre-determined period of additional drying be subjected to the same or similar selector operation.

The selection of hard shrunken gel particles may be made increasingly sensitive by passing the gel particles undergoing separation through a plurality of the above-described selector operations after short intermediate periods of drying. Since imperfection in sphericity can lead to some spread of trajectories, it will at times occur that hard gel particles will not travel far enough to be deposited in the receptacle or chute most remote from the inclined dropping base. The probability that, in a second dropping of the same particle, a similar line of trajectory would be followed is extermely small, however. In fact, to a good approximation, assuming the probability of being improperly selected in one selector operation is 10 per cent, then the probability of being selected improperly a second successive time would be only one per cent. It is believed evident that a selection to a high degree of almost any desired extent may be realized by having a larger number of successive selector operations. Thus, in order to separate the gel particles according to a narrower degree of hardness or to reduce error, the procedure generally need only be repeated a multiple number of times and in each operation only the particles having the outermost trajectories, selected.

The invention may be further understood by reference to the attached drawings wherein:

Figure 1 is an illustration of a simple embodiment of the invention.

Figure 2 is an elevational view partly in section illustrating suitable apparatus for accomplishing a continuous selective process employing principles of the invention.

Figure 3 is an elevational view partly in section showing an alternate apparatus set-up suitable for the continuous selective operation.

Figure 4:
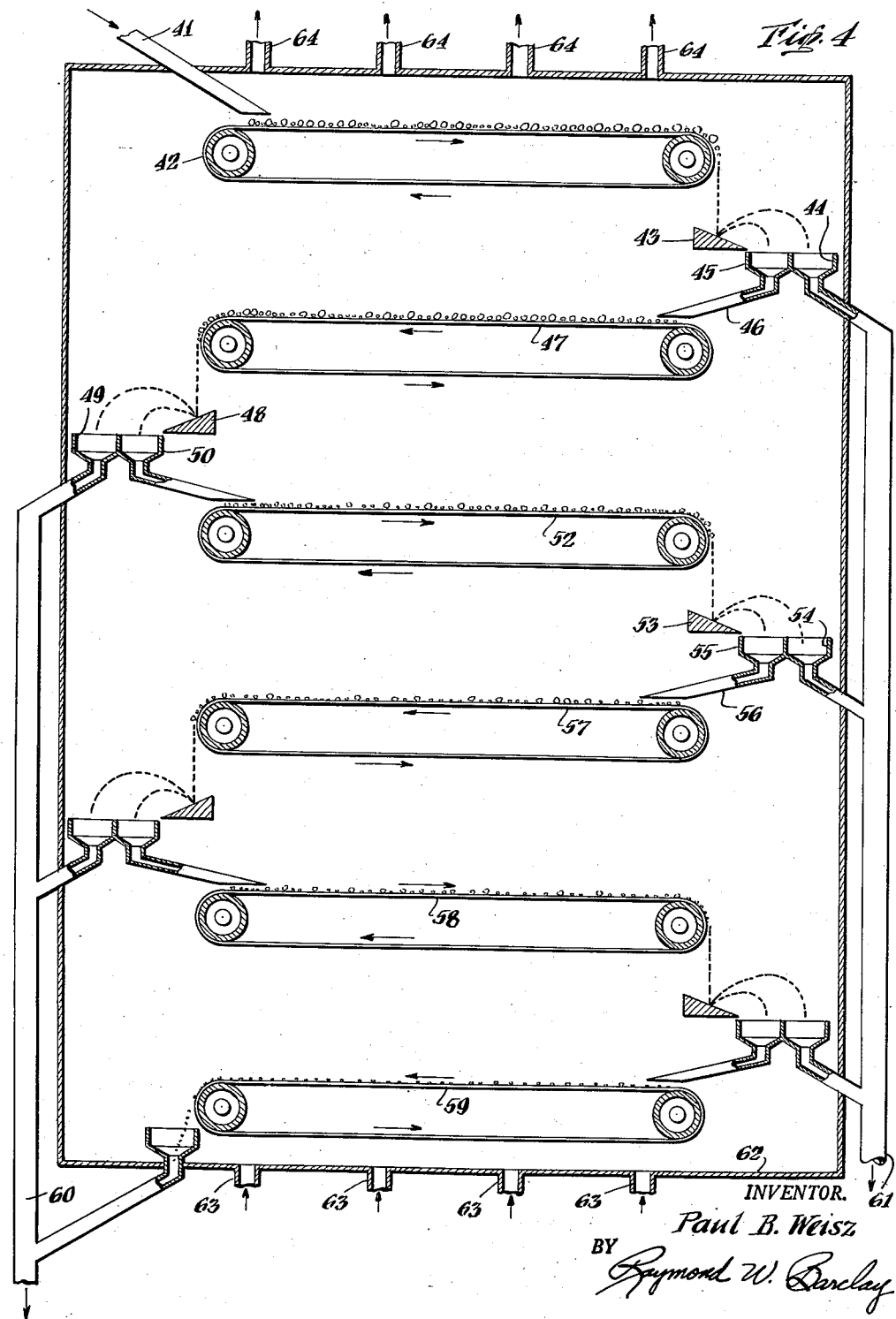
Figure 4 is an elevational view partly in section illustrating an apparatus designed for a plurality of successive selector operations.

Referring particularly to Figure 1, partially dried spherical gel particles, a portion of which have undergone substantially complete shrinkage and the remainder of which have not yet attained substantially complete shrinkage, are dropped from a moving belt 10 onto an inclined base 11. The particles which have undergone substantially complete shrinkage, and are accordingly harder, rebound from the inclined plate in a line of greater trajectory, whereas the particles which have not yet undergone complete shrinkage and which are characterized by a greater moisture content rebound from the inclined plate in a line of lesser trajectory. The particles of lesser trajectory are collected in a receptacle 12 adjacent to the inclined base and the particles of greater trajectory, collected in receptacle 13 remote from the inclined base.

Turning now to Figure 2, partially dried spherical particles of inorganic gel are conducted by means of trough 14 onto an endless moving belt 15. This belt passes through a chamber 16. Drying gases are passed into chamber 16 through conduit 17 and exhaust gases are withdrawn therefrom through outlets 18. The spherical gel particles continue passage along the belt and drop from the end thereof onto inclined base 19 of a sufficiently hard material as to cause the particles to rebound. The particles which are substantially complete as regards shrinkage rebound with a greater trajectory into chute 20 and pass from the apparatus through outlet conduit 21. The gel particles which have not yet attained complete shrinkage, and are accordingly relatively softer than the completely shrunken particles, rebound with a lesser trajectory into chute 22. The latter particles pass through conduit 23 and enter a bucket type elevator 24. The particles are then lifted from the point of entrance to an elevated point at the top of the elevator. From said elevated point, the particles are dumped from the elevator buckets through conduit 25 which serves to recycle the particles passing therethrough to the endless moving belt 15. This continuous process, as pointed out above, serves to eliminate any spread of trajectories due to imperfection in the spherical form of the particles.

Referring to Figure 3, partially dried spherical particles of inorganic gel are led through conduit 26 onto endless moving belt 27. The particles pass along the moving belt and drop from the end thereof onto an inclined plate 28. Particles which are substantially completely shrunken rebound from the inclined plate in a line of greater trajectory and fall into receptacle 29. The particles which are only partially shrunken rebound in a line of lesser trajectory and fall into receptacle 30. The latter particles pass from receptacle 30 onto a second endless moving belt 31, moving in a direction opposite to that of the first belt. The particles pass along the second moving belt and fall from the end thereof into a receptacle 32. The particles then pass through conduit 33 into a gas lift chamber 34. Warm gas, such as air, steam, or other gas inert to the particles is conducted through pipe 35 and serves to lift the gel particles in chamber 34 vertically upward while simultaneously subjecting them to drying. The particles so dried pass from chamber 34 through outlet conduit 36 and are thus recycled onto moving belt 27. A vapor seal is maintained in conduit 33 by passage of a gas through pipe 37. This gas will generally be the same gas as that conducted through pipe 35. Surrounding the two endless belts is a wall 38 defining a chamber. Drying gases are conducted into this chamber through inlet pipes 39 and exhaust gases are withdrawn therefrom through outlet pipes 40. The use of the gas lift which this apparatus employs is advantageous since the gel particles are simultaneously being dried while being lifted to the desired recycling elevation.

In the apparatus of Figure 4, partially dried spherical inorganic gel particles are conducted by means of trough 41 onto an endless moving belt 42. The particles, comprising those which have undergone substantially complete shrinkage and those which have undergone only partial shrinkage, pass along the surface of the endless belt and drop from the end thereof onto an inclined base 43. The completely shrunken particles rebound from said base in a line of greater trajectory and fall into receptacle 44. The particles which have only been partially shrunken rebound from base 43 in a line of lesser trajectory and fall into receptacle 45. The latter particles are conducted through conduit 46 and pass onto the surface of a second moving belt 47 which is moving in a direction opposite to that of the first belt. The particles move along the second moving belt and drop from the end thereof onto a second inclined base 48. The particles which have now attained complete shrinkage rebound from base 48 in a line of greater trajectory and fall into receptacle 49. The particles which still have not attained complete shrinkage rebound from plate 48 in a line of lesser trajectory and fall into receptacle 50. The latter particles pass through conduit 51 onto the surface of a third endless moving belt 52 moving in a direction opposite to that of the second belt. The particles pass along the surface of the third moving belt and drop from the end thereof onto a third inclined base 53. The particles which have now attained substantially complete shrinkage rebound from base 53 in a line of greater trajectory into receptacle 54. The particles which still have not yet attained substantially complete shrinkage rebound from base 53 in a line of lesser trajectory and fall into receptacle 55. These latter particles pass through conduit 56 onto the surface of a fourth moving belt 57 and the above operations are repeated, the particles of greater trajectory being collected in the outermost receptacle and the particles of lesser trajectory being collected in a receptacle adjacent to the inclined base and conducted to one or more subsequent endless moving belts such as 58 and 59 for further processing. The substantially completely shrunken gel particles are removed from the outermost receptacles and pass into conduits 60 and 61. The entire operation is maintained in a drying atmosphere as each of the endless moving belts is contained in a chamber 62 having inlet pipes 63 for admitting drying gas and outlet pipes 64 for withdrawing exhaust gases. It will be understood that the number of endless moving belts employed and inclined bases will depend upon the extent of desired separation of the partially dried spherical inorganic gel particles being processed. It is contemplated that any convenient number of endless belts and inclined bases may be employed in achieving the objects of the invention.

The following example will serve to illustrate the process of the invention without limiting the same:

Example

A silica-alumina hydrosol was prepared by mixing 1.00 volume of a solution of sodium silicate containing 157.0 grams of $SiO_2$ per liter with 1.00 volume of a solution containing 39.79 grams of aluminum sulfate and 30.51 grams of sulfuric acid per liter. The resulting colloidal solution was ejected from a nozzle in the form of globules into a column of gas oil, the depth of which was 8 feet. The globules of solution fell through the oil and gelled before passing into a layer of water located beneath the oil. The time of gelation for the concentrations and proportions of reactants given above was about 4 seconds. The spheroidal particles of gel were conducted out of the bottom of the column into a stream of water and, on removal from the water, base-exchanged with an aqueous solution of aluminum sulfate and water-washed. The pellets were then slowly and uniformly dried in superheated steam at about 300° F. until shrinkage of the gel particles was apparently complete.

The spherical gel particles so obtained were then dropped from a height of 27 centimeters in a vertical line onto an inclined glass plate, the vertical edge of which measured 1.5 centimeters and the base of which measured 13 centimeters. The dropped particles rebounded from the surface of the inclined glass plate. Those particles which were substantially complete as regards shrinkage rebounded in a line of greater trajectory and were collected in a tray remote from the inclined glass plate. Those particles which had not attained substantially complete shrinkage rebounded in a line of lesser trajectory and were collected in a tray adjacent to the inclined glass plate. All particles which rebounded a distance of at least 35 centimeters from the point of dropping were collected in the tray remote from the glass plate. In this single step selection process, about 90 per cent of all hard gel particles, representing those which had undergone substantially complete shrinkage, were collected in the outermost tray. The remaining 10 per cent of the particles fell short of the outermost tray and were collected in the tray adjacent to the inclined glass plate.

It will be evident from the foregoing example that the procedure of this invention affords an effective means for selectively separating partially dried spherical gel particles. While the particles will be dropped generally in a vertical line onto the inclined base, it is within the purview of this invention to vary the angle of incidence between the path of the falling particles and the plane of the inclined base. Thus, for grazing incidence, the particles will rebound considerably less than for angles near to the perpendicular. The inclined base is made of a material of sufficient hardness as to cause the gel particles falling thereon to rebound. Generally, the inclined base will be made of metal, glass, porcelain, or any other material having the requisite hardness. The angle of inclination of the base likewise may be varied, depending on the nature of the inorganic gel particles being processed. Generally, however, the angle of inclination of the inclined base will be between about 5 and about 45° with the horizontal.

I claim:

1. A method for selectively separating partially dried spherical particles of inorganic gel, a portion of which have undergone substantially complete shrinkage and the remainder of which have not yet attained substantially complete shrinkage, which comprises dropping said particles from a pre-determined height onto an inclined base of sufficient hardness as to cause the particles to rebound, and collecting the particles of lesser trajectory in one receptacle and the particles of greater trajectory in a second receptacle.

2. A method for selectively separating partially dried spherical particles of inorganic gel, a portion of which have undergone substantially complete shrinkage and the remainder of which have not yet attained substantially complete shrinkage, which comprises dropping said particles from a point of pre-determined height onto an inclined base of sufficient hardness as to cause the particles to rebound, collecting the particles of lesser trajectory in one receptacle and the particles of greater trajectory in a second receptacle and recycling said particles of lesser trajectory to said point of dropping.

3. A continuous process for selectively separating partially dried spherical particles of inorganic gel, a portion of which have undergone substantially complete shrinkage and the remainder of which have not yet attained substantially complete shrinkage, which comprises continuously passing said particles through a drying zone, dropping said particles from said zone onto an inclined base of sufficient hardness as to cause the particles to rebound, collecting the particles of lesser trajectory in one receptacle and the particles of greater trajectory in a second receptacle and recycling said particles of lesser trajectory to said drying zone.

4. A continuous process for selectively separating partially dried spherical particles of inorganic gel, a portion of which have undergone substantially complete shrinkage and the remainder of which have not yet attained substantially complete shrinkage, which comprises continuously passing said particles through a drying zone, dropping the particles from said zone onto an inclined base of sufficient hardness as to cause the particles to rebound, collecting the particles of lesser trajectory in one receptacle and the particles of greater trajectory in a second receptacle, conducting said particles of lesser trajectory to a vertical gas lift, passing gas through said lift, thereby causing the gel particles contained therein to rise to an elevated point in said lift and recycling said particles from said elevated point to said drying zone.

5. A continuous process for selectively separating partially dried spherical particles of inorganic gel, a portion of which have undergone substantially complete shrinkage and the remainder of which have not yet attained substantially complete shrinkage, which comprises maintaining said particles in a drying atmosphere, dropping said particles from a pre-determined height onto an inclined base of sufficient hardness as to cause the particles to rebound, collecting the particles of lesser trajectory in one receptacle and the particles of greater trajectory in a second receptacle and thereafter dropping said particles of lesser trajectory from a pre-determined height onto a hard inclined base a multiple number of times to attain selective separation thereof.

PAUL B. WEISZ.

REFERENCES CITED

The following references are of record in the file of this patent:

UNITED STATES PATENTS

| Number | Name | Date |
|---|---|---|
| 173,582 | Buzby | Feb. 15, 1876 |
| 1,155,292 | Torrey | Sept. 28, 1915 |
| 2,384,944 | Marisic | Sept. 18, 1948 |

FOREIGN PATENTS

| Number | Country | Date |
|---|---|---|
| 656,038 | France | Apr. 26, 1929 |